United States Patent [19]
Pietila et al.

[11] Patent Number: 5,312,133
[45] Date of Patent: May 17, 1994

[54] CROSS VEHICULAR ASSEMBLY INCLUDING KNEE BOLSTERS

[75] Inventors: Thomas W. Pietila, Brighton; Gerald A. Heath, Canton; James H. Zimmerman, Ann Arbor, all of Mich.

[73] Assignee: Ford Motor Company, Dearborn, Mich.

[21] Appl. No.: 992,361

[22] Filed: Dec. 17, 1992

[51] Int. Cl.⁵ ............................................. B60R 21/045
[52] U.S. Cl. ........................................ 280/752; 180/90
[58] Field of Search ................ 280/732, 752; 180/90; 296/70, 72, 192

[56] References Cited

U.S. PATENT DOCUMENTS

| | | | |
|---|---|---|---|
| 3,287,980 | 7/1964 | Gilliland | 73/493 |
| 3,590,136 | 6/1971 | Kunishi et al. | 174/50 |
| 3,861,486 | 1/1975 | Wilfert | 180/90 |
| 4,105,223 | 8/1978 | Oda et al. | 280/752 |
| 4,455,338 | 6/1984 | Henne | 428/137 |
| 4,662,649 | 5/1987 | Ikeda et al. | 280/751 |
| 4,717,195 | 1/1988 | Okuyama et al. | 296/72 |
| 4,759,568 | 7/1988 | Paefgen et al. | 280/732 |
| 4,767,153 | 8/1988 | Kawasaki et al. | 280/752 |
| 4,791,964 | 12/1988 | Van Kirk et al. | 138/115 |
| 4,811,760 | 3/1989 | Van Kirk et al. | 138/115 |
| 4,909,566 | 3/1990 | Hashimoto et al. | 296/192 |
| 5,088,571 | 2/1992 | Burry et al. | 180/90 |

OTHER PUBLICATIONS

SAE Technical Paper Series 870200 entitled "Instrument Panel Structure Utilizing Linear Welded A/C Ducts," 1985 Society of Automotive Engineers, Inc.

*Primary Examiner*—Karin L. Tyson
*Attorney, Agent, or Firm*—Damian Porcari; Roger L. May

[57] ABSTRACT

A vehicular assembly incorporating knee bolsters. The assembly is fabricated largely from integrally injection molded plastic that is capable of reinforcing the knee bolsters, supporting the instrument panel and forming the ducts of an air distribution system. In the event of a collision, the knee bolster plates are stabilized so that they can cushion and limit the movement of the knees of a driver or passenger.

20 Claims, 16 Drawing Sheets

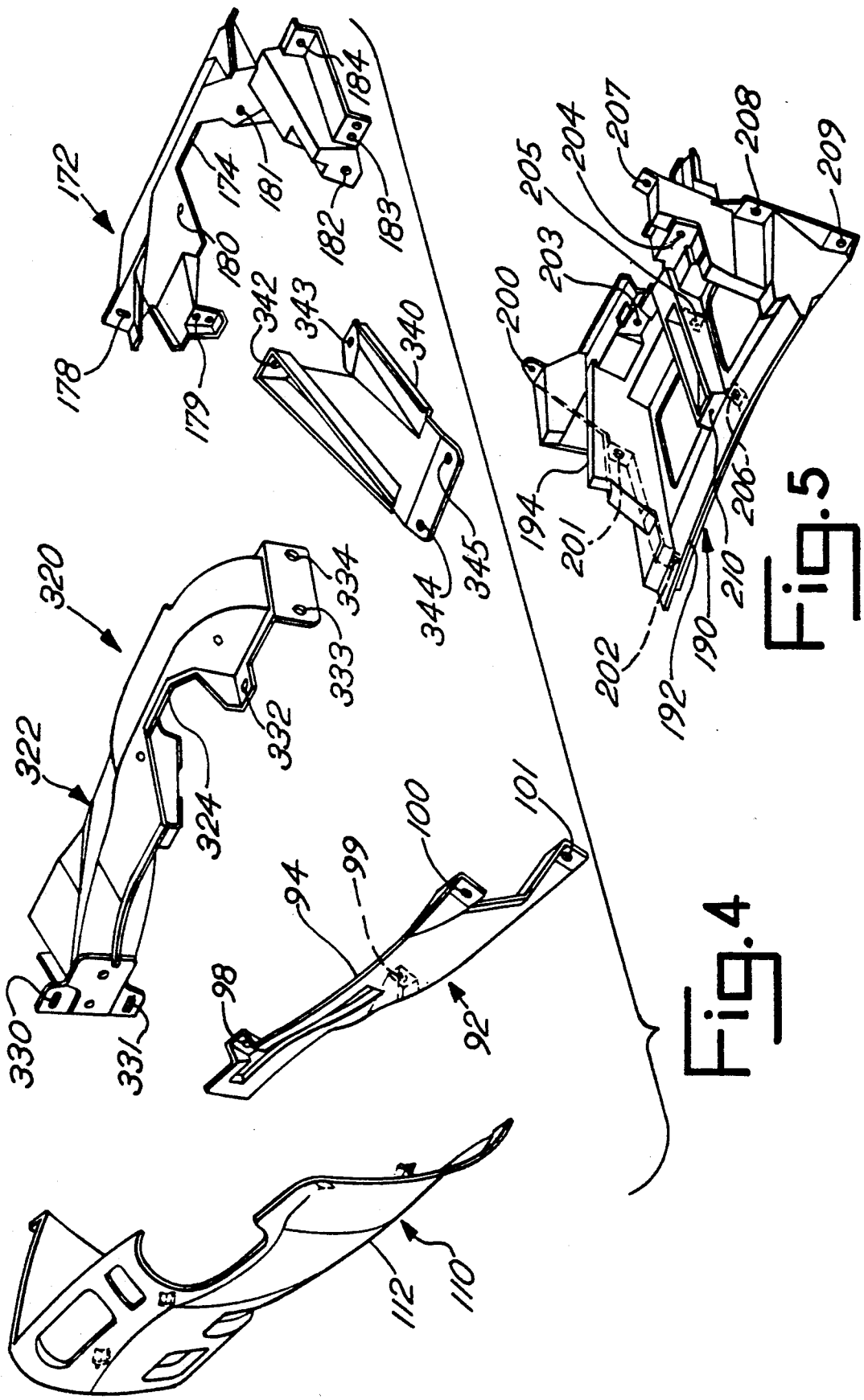

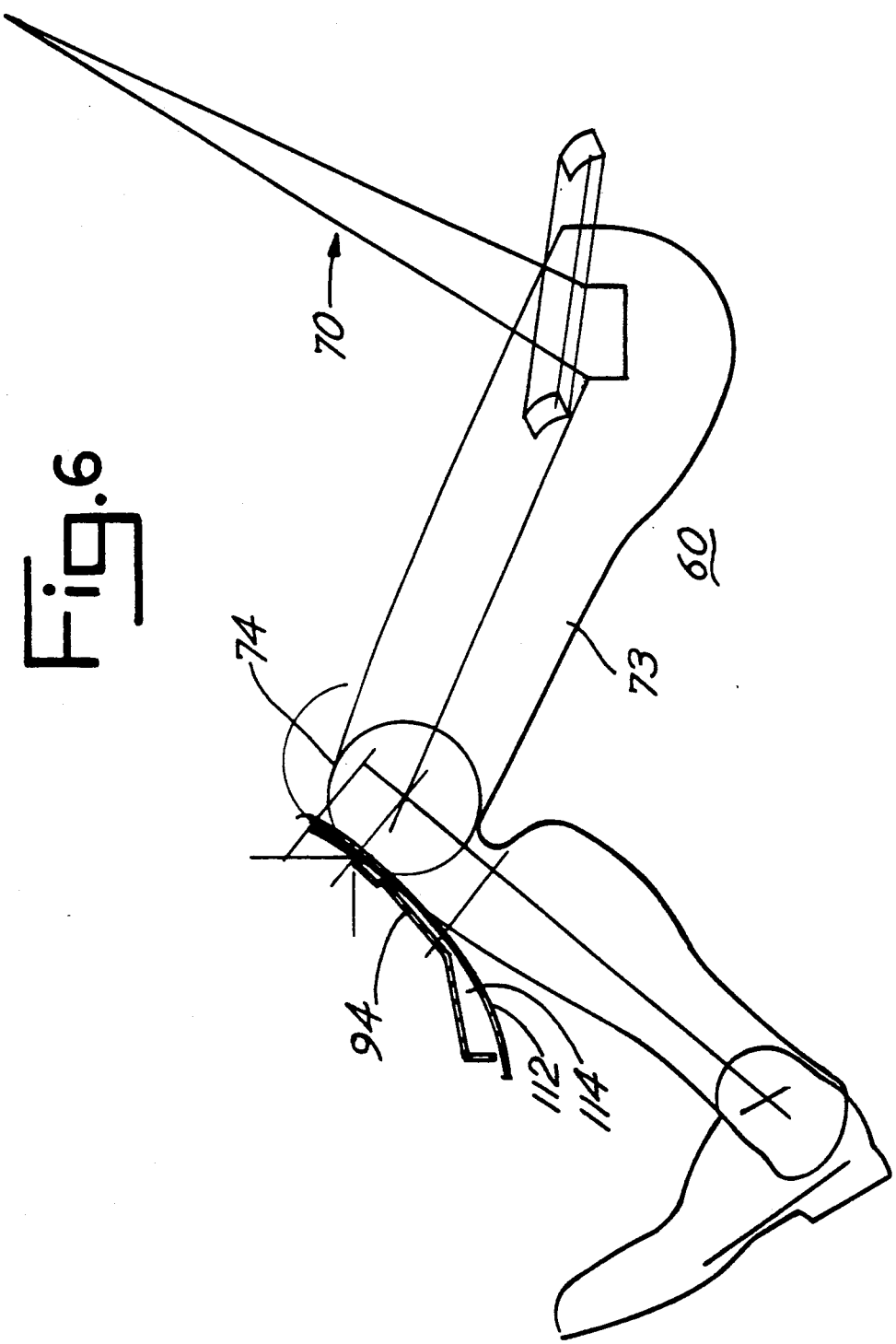

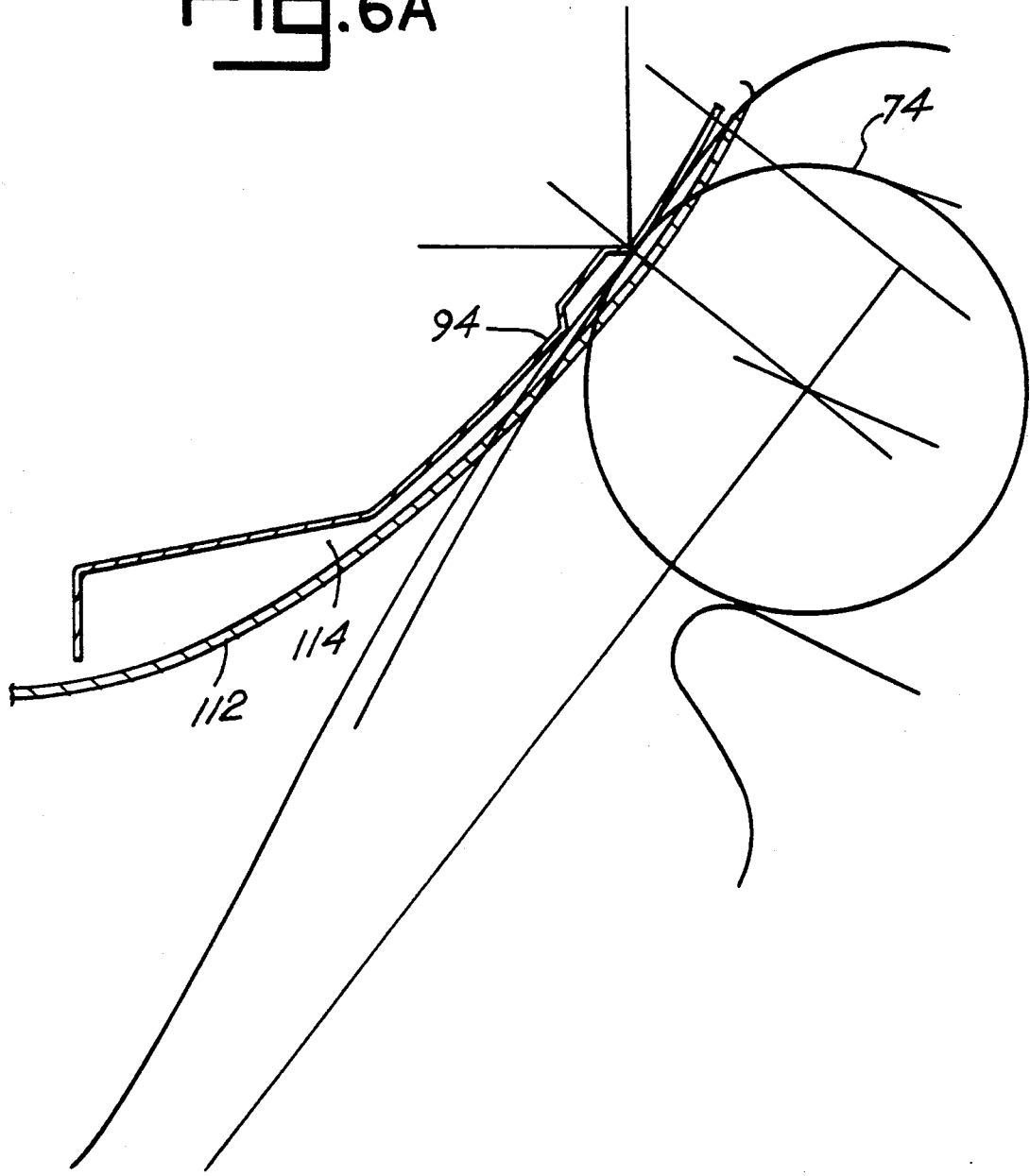

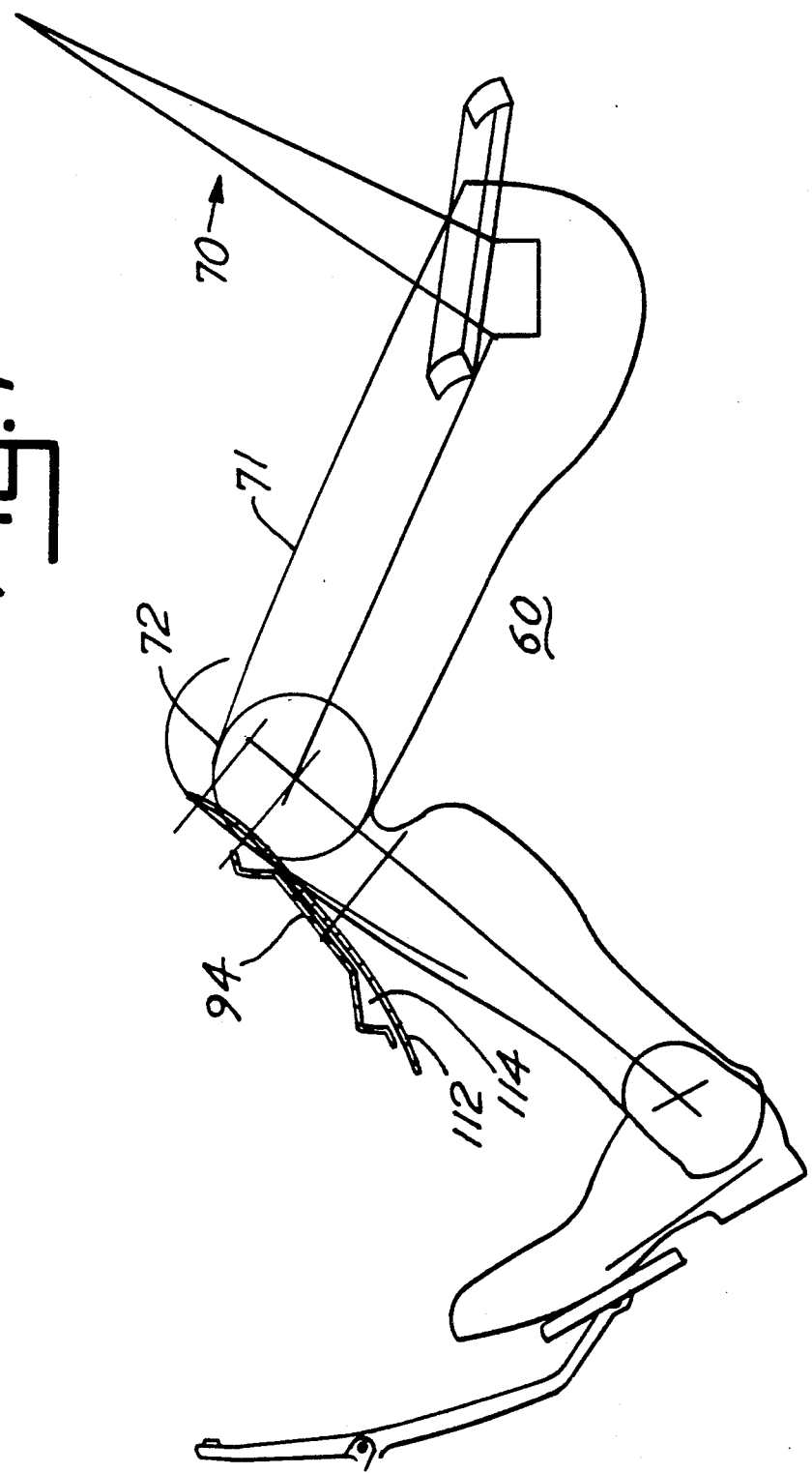

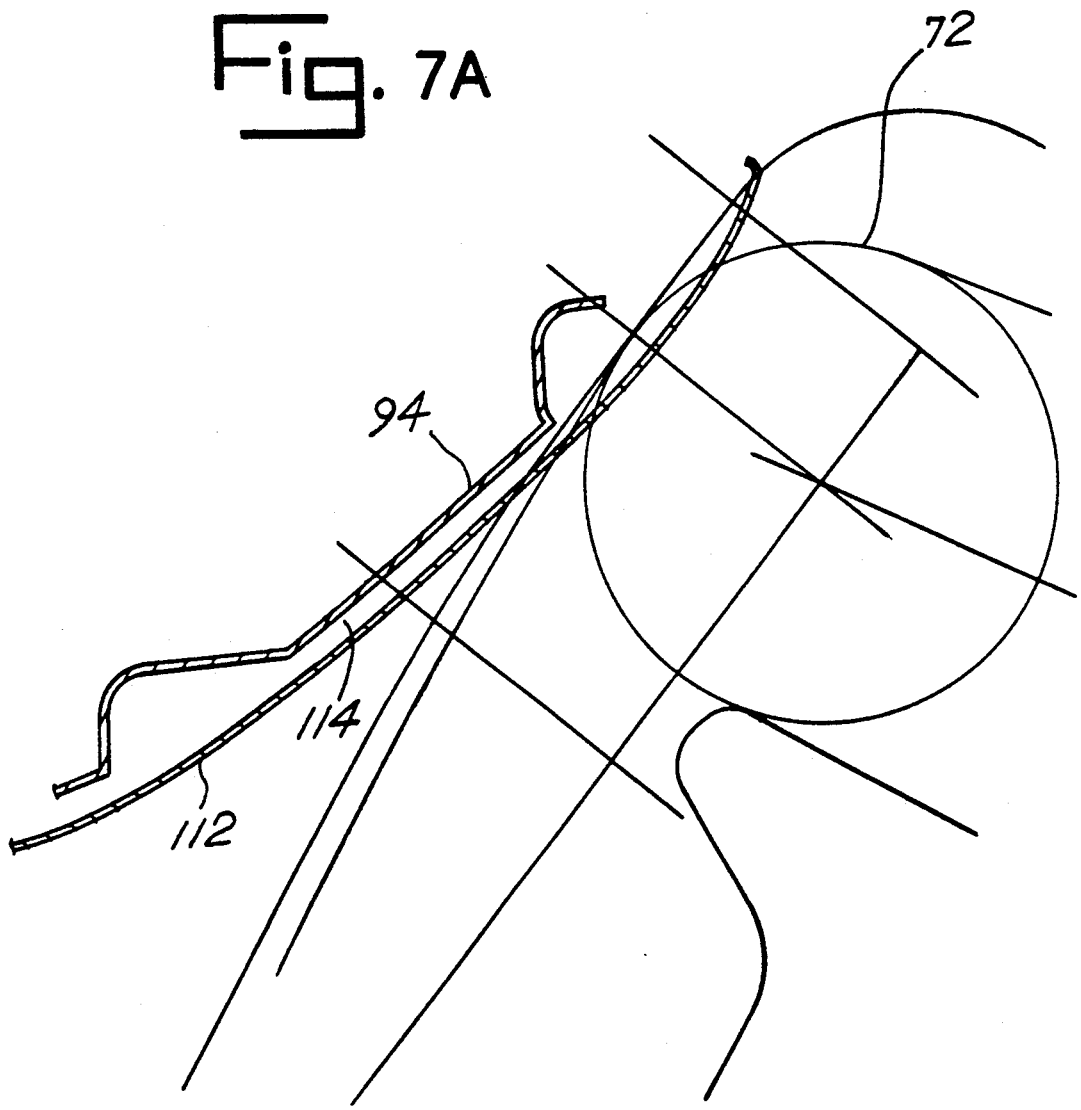

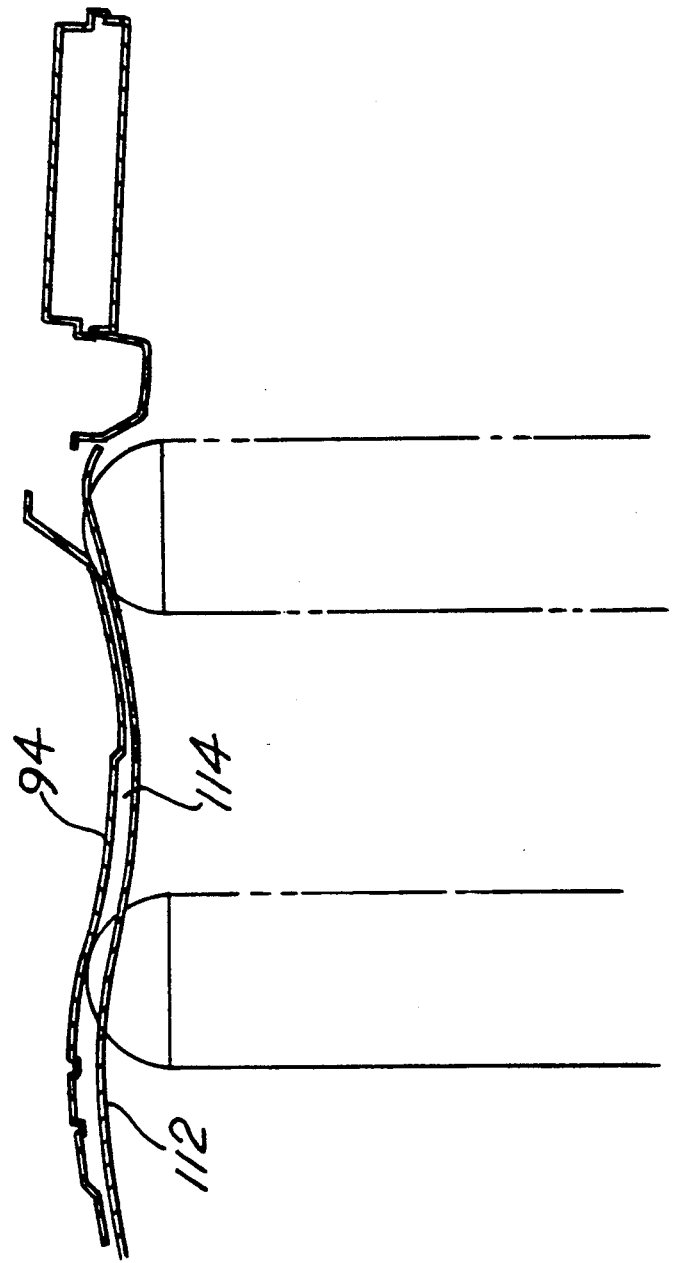

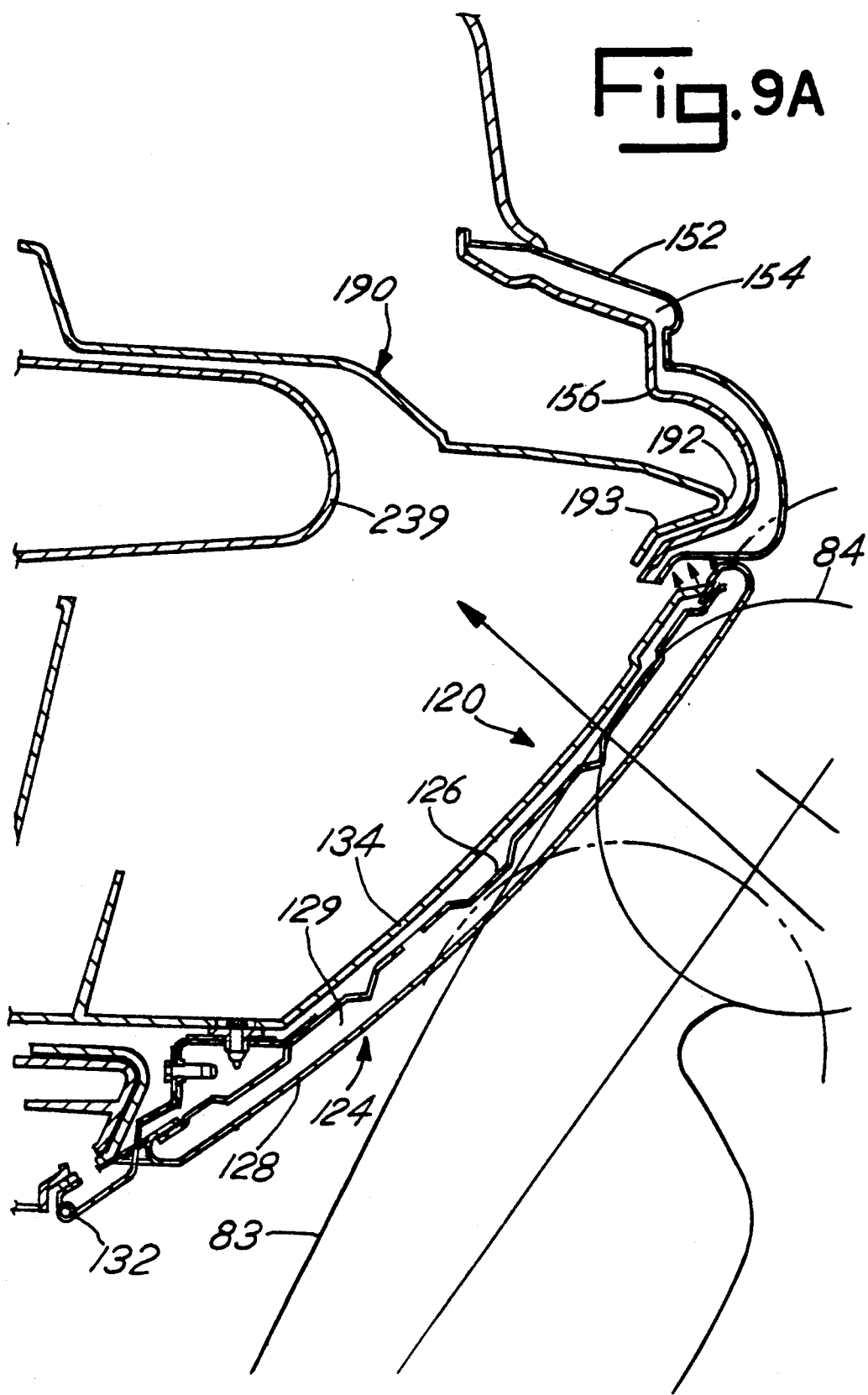

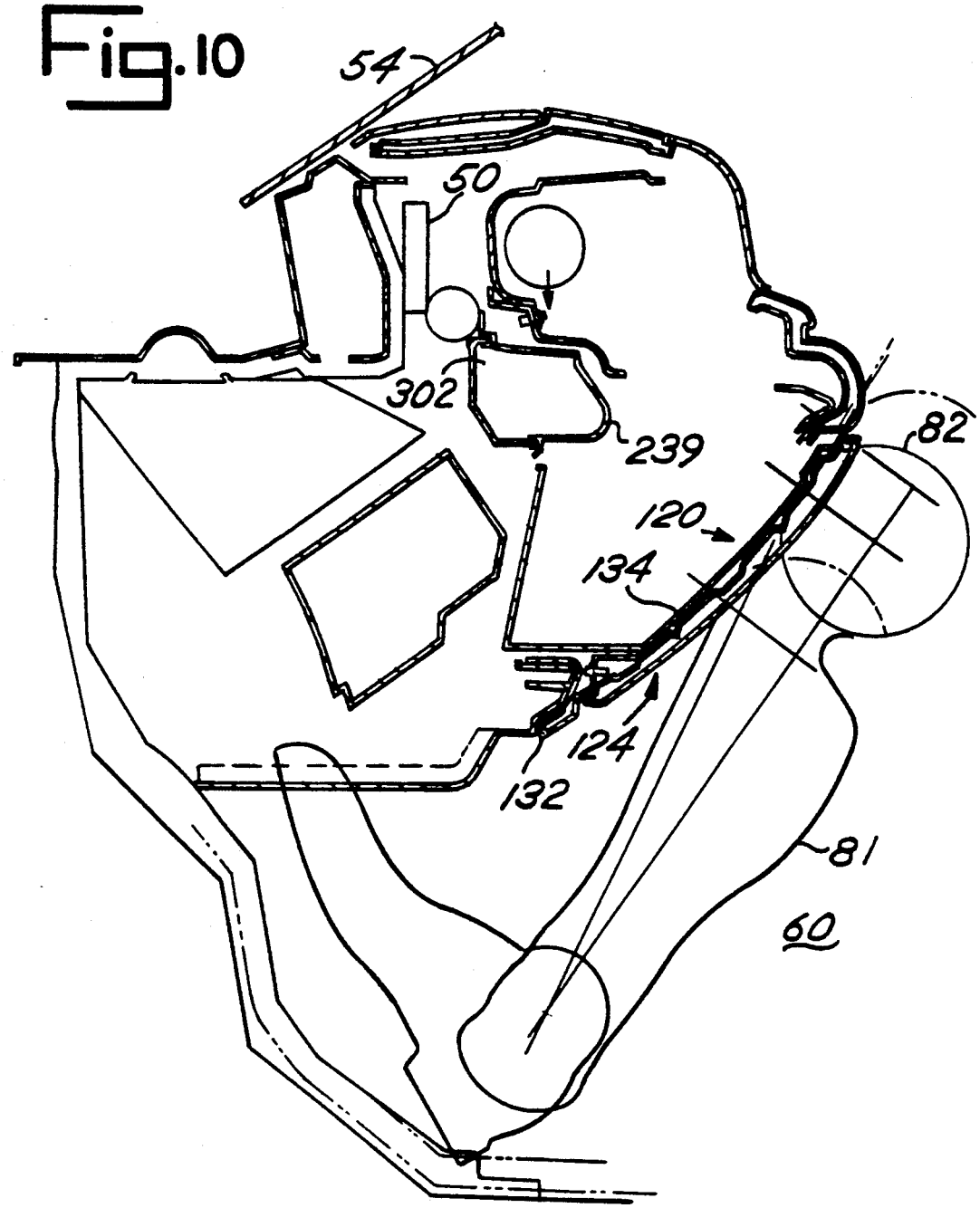

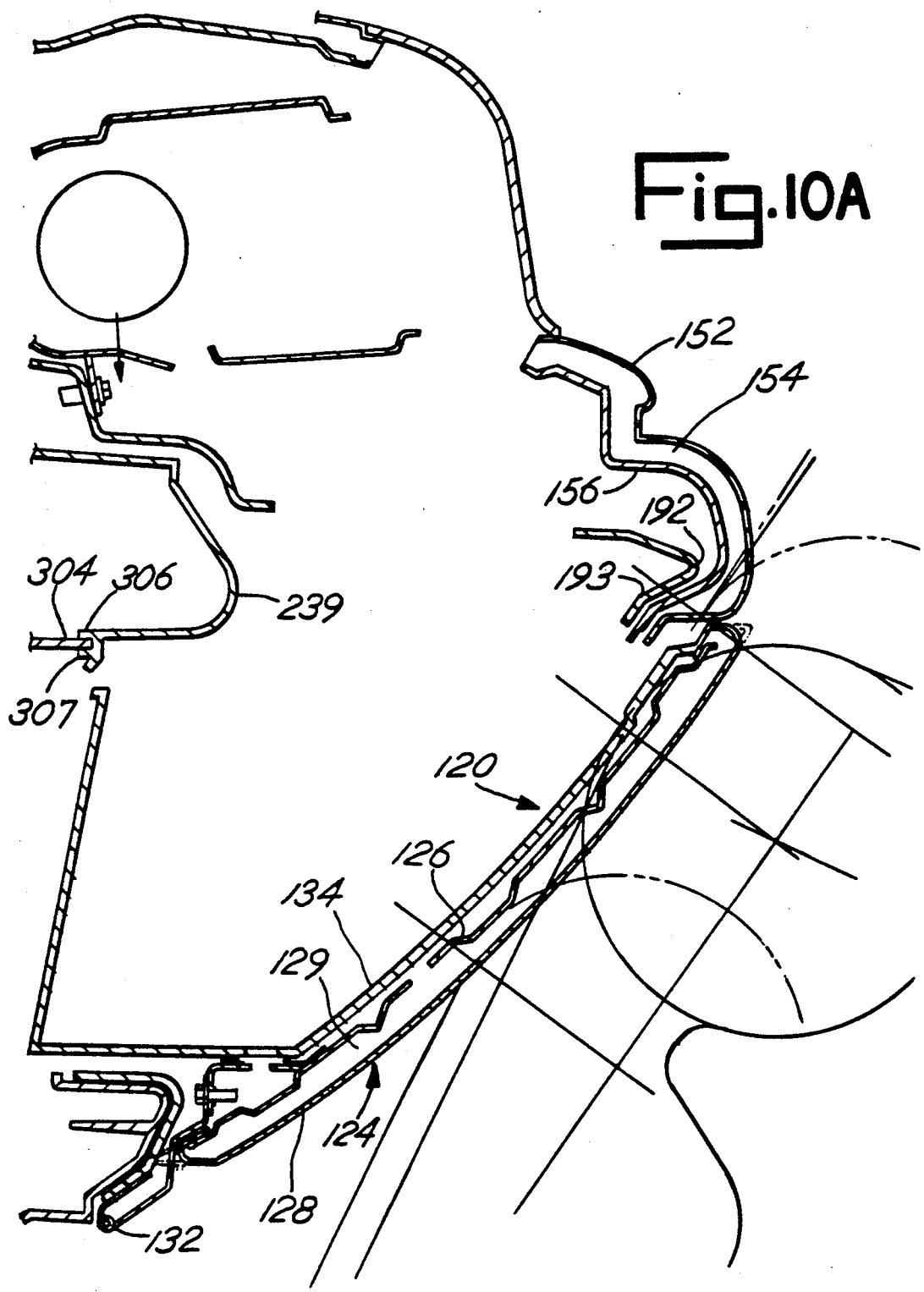

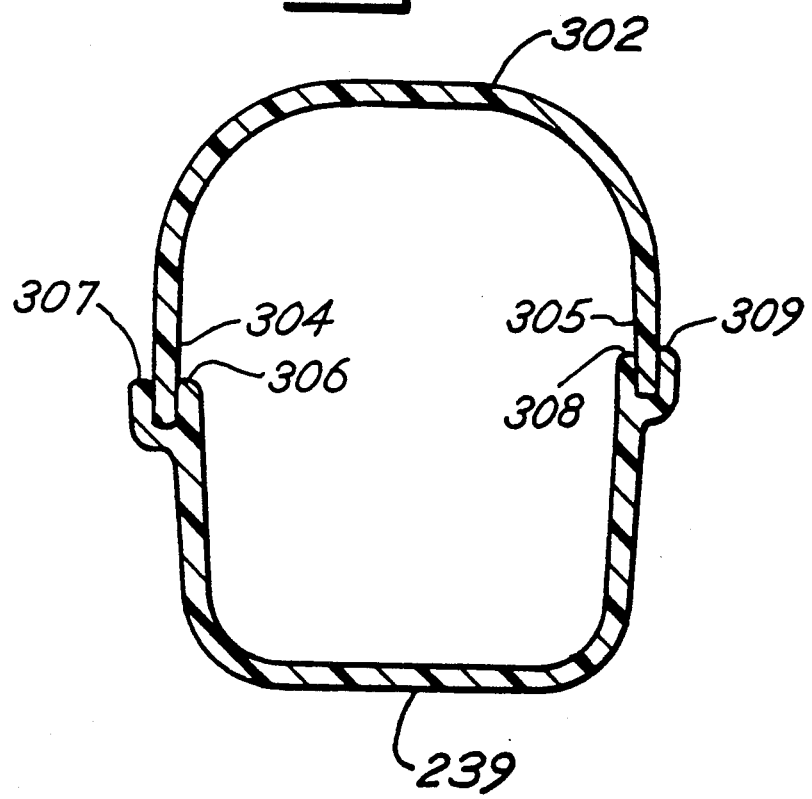

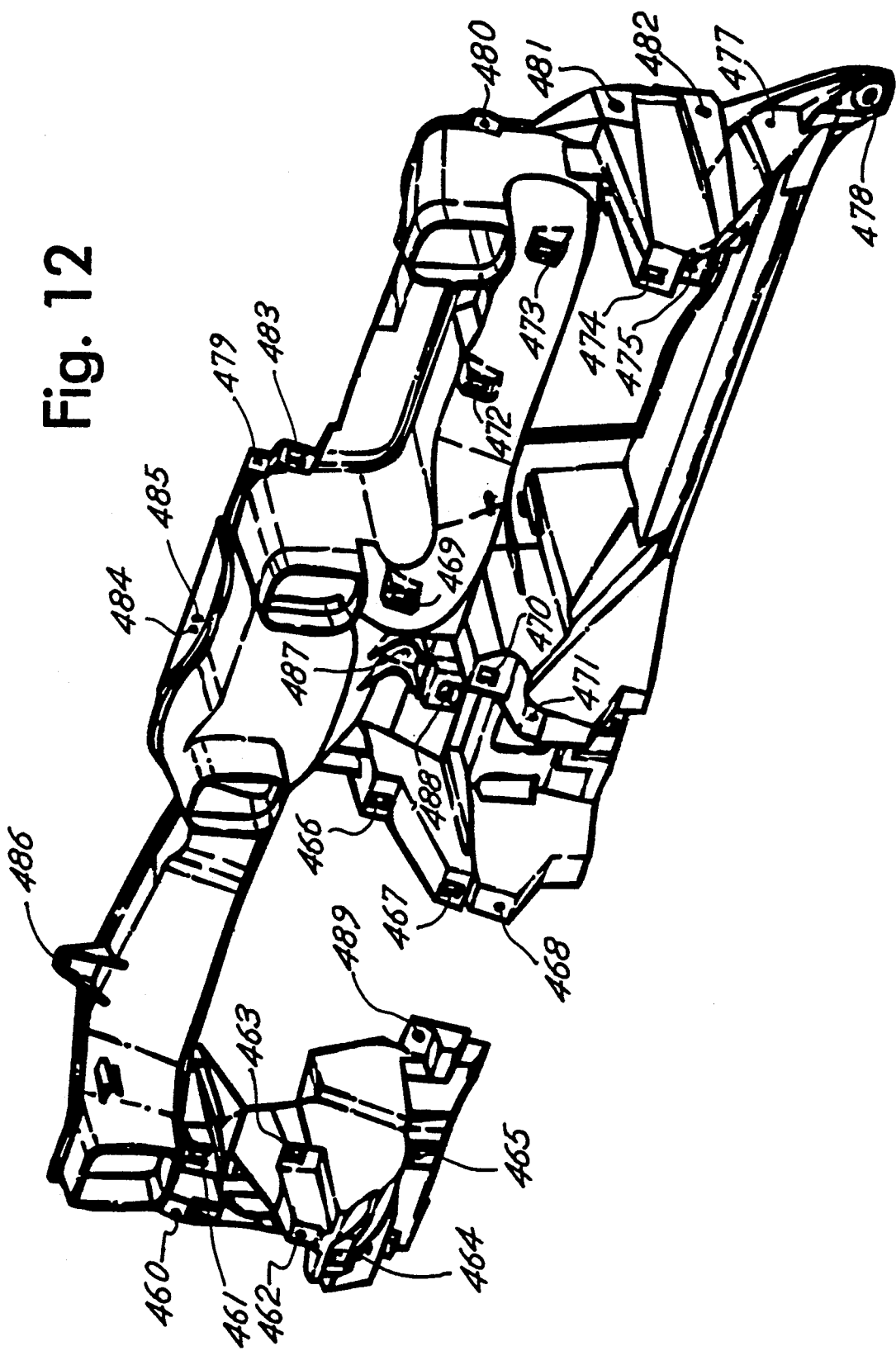

CROSS VEHICULAR ASSEMBLY INCLUDING KNEE BOLSTERS

FIELD OF THE INVENTION

This invention is directed to a vehicular assembly incorporating knee bolsters. More particularly, the vehicular assembly also includes means for reinforcing the knee bolsters, supporting an instrument panel and forming ducts of an air distribution system.

BACKGROUND OF THE INVENTION

Cross vehicular assemblies incorporating ducts for a vehicular air distribution system suitable for fabrication from thermal plastic material have been disclosed in the past. Such ducts are disclosed in U.S. Pat. No. 4,791,964 (Van Kirk-issued Dec. 20, 1988) and U.S. Pat. No. 4,811,760 (Van Kirk et al.-issued Mar. 14, 1989).

Vehicular knee bolsters also have been disclosed in the past. For example, a knee bolster for a glove compartment incorporating some plastic parts is disclosed in U.S. Pat. No. 4,662,649 (Ikeda et al.-issued May 5, 1987).

Vehicular beams extending over substantially the entire width of a passenger compartment for defining air supply channels and for supporting an instrument panel and an airbag also have been disclosed in the past. One such beam is disclosed in U.S. Pat. No. 4,759,568 (Paefgen et al.-issued Jul. 26, 1988).

In spite of the improvements described in the foregoing patents, there is no known plastic cross vehicular assembly with reinforcing knee bolsters, defining air distribution ducts and supporting an instrument panel. In the past, such a multifunctional assembly used steel reinforcements or frames. The use of steel reinforcements or frames increases weight, the difficulty of assembly and the probability of squeaks and rattles.

Accordingly, there is a need for an improved plastic cross vehicular assembly for reinforcing knee bolsters, defining ducts for an air distribution system and supporting an instrument panel that decreases weight, costs and the probability of squeaks and rattles, while increasing reliability and ease of assembly.

SUMMARY OF THE INVENTION

According to a first aspect of the invention, a multifunctional cross vehicular assembly is used to bolster one or more knees of one or more occupants of a motor vehicle having a body that includes a cowl adjacent a windshield and having a compartment for the occupants. Knee bolsters are provided for absorbing kinetic energy from the knees of the occupants in the event of impact. Plastic reinforcements transfer force from the knee bolsters without absorbing substantial kinetic energy from the knees. Duct means fabricated from plastic extend across more than half the entire width of the compartment of the vehicle between the cowl and the instrument panel for distributing air in the compartment. The duct means also transfer force from the reinforcements without absorbing substantial kinetic energy from the knees. The duct means, reinforcements and body of the vehicle are rigidly interconnected so that the position of the knee bolsters relative to the body is stabilized by the transfer of force through the reinforcements and duct means while kinetic energy from the knees is absorbed by the knee bolsters to cushion and limit the movement of the knees of the occupants in the event of a collision.

According to one preferred embodiment of the invention, the duct means comprise an integral plastic rear duct member for defining air distribution inlets for an instrument panel and an integral plastic front duct member adapted to comate with the rear duct member for producing one or more cavities defining the ducts of the air distribution system.

According to another preferred embodiment of the invention, the duct means are fastened to the right and left sides of the cowl and also to the top of the cowl.

Additional features and advantages of the invention will be more apparent from the following detailed discussion of certain preferred embodiments.

BRIEF DESCRIPTION OF DRAWINGS

The detailed description of certain preferred embodiments of the invention is provided below with reference to the accompanying drawings, wherein the same reference numeral is used for a given feature in all figures.

FIG. 4 is an enlarged, exploded, perspective view of a portion of the assembly shown in FIG. 1.

FIG. 5 is an enlarged, perspective view of a passenger reinforcement member shown in FIG. 1.

FIG. 6 is a fragmentary, cross sectional view of a model of a driver's left knee and leg illustrating the impact of the knee with an exemplary bolster.

FIG. 6A is an enlarged, fragmentary, cross sectional view of a portion of the structure shown in FIG. 6.

FIG. 7 is a fragmentary, cross sectional view of a model of a driver's right leg and knee showing the impact of the knee with an exemplary bolster.

FIG. 7A is an enlarged, fragmentary, cross sectional view of a portion of the structure shown in FIG. 7.

FIG. 8 is a top plan view of the driver's knee bolster shown in FIGS. 6, 6A, 7 and 7A.

FIG. 9A is an enlarged, fragmentary, cross sectional view of a portion of the structure shown in FIG. 9.

FIG. 10 is a fragmentary, cross sectional view of a model of a passenger's right leg and knee showing the impact of the knee with an exemplary bolster.

FIG. 10A is an enlarged, fragmentary, cross sectional view of a portion of the structure shown in FIG. 10.

FIG. 11 is a cross sectional view taken along line A—A shown in FIG. 3 illustrating a preferred form of attachment for component parts of an exemplary duct assembly.

FIG. 12 is an alternative embodiment of the rear duct member shown in FIG. 3.

DETAILED DESCRIPTION OF CERTAIN PREFERRED EMBODIMENTS

Figure 9:
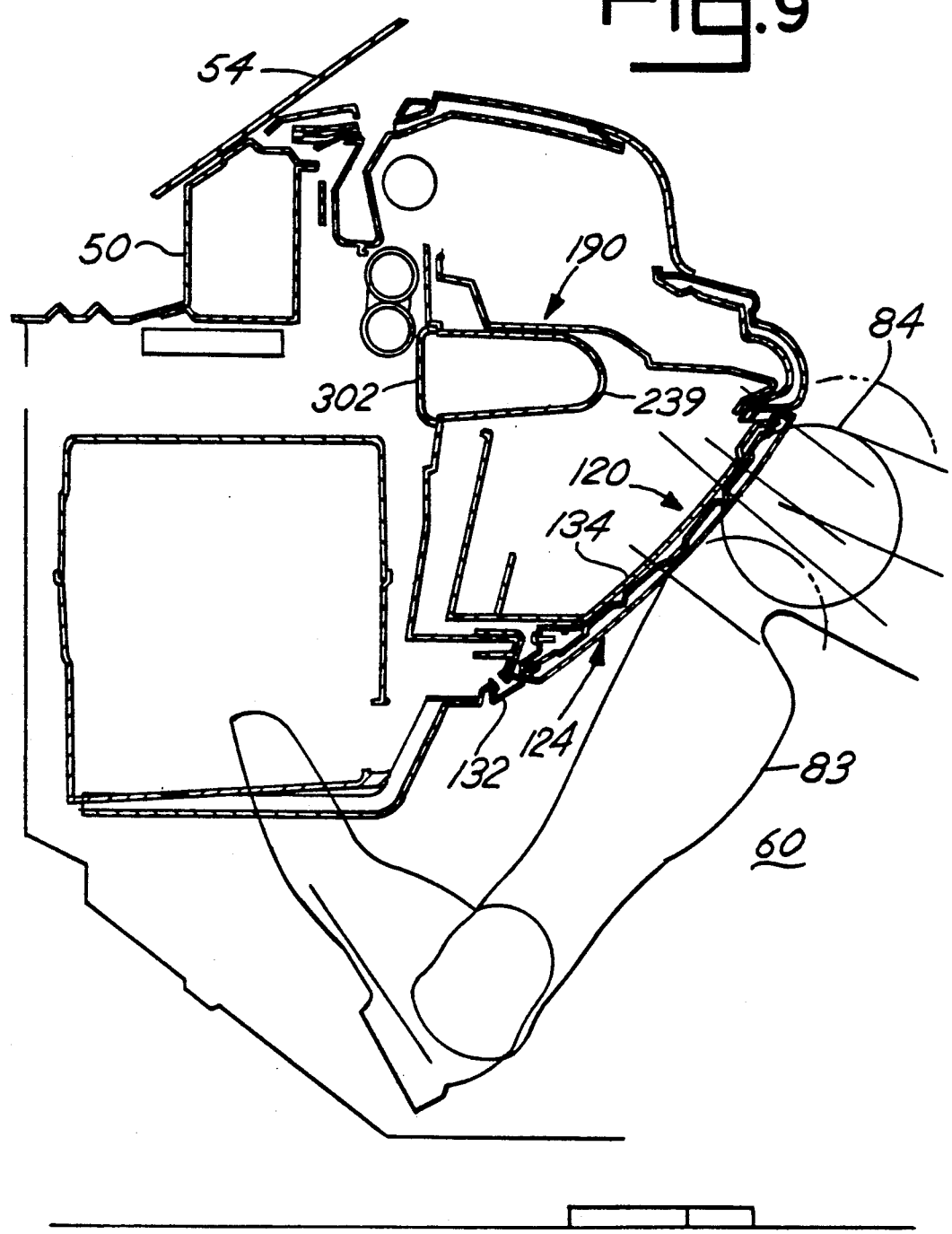
FIG. 9 is a fragmentary, cross sectional view of a model of a passenger's left leg and knee showing the impact of the knee with an exemplary bolster.

Referring to the drawings, a preferred form of a multifunctional cross vehicular assembly made in accordance with the present invention is adapted for use in connection with a motorized vehicle (not shown) incorporating a cowl 50 and a windshield 54 (FIGS. 9 and 10). Cowl 50 forms a portion of the body of the vehicle (not shown). The motorized vehicle defines a compartment 60 that holds a driver 70 having a right leg 71, a right knee 72, left leg 73 and a left knee 74 (FIGS. 6 and 7). The compartment also is adapted to hold a passenger 80 having a right leg 81, a right knee 82, left leg 83 and a left knee 84 (FIGS. 9 and 10).

Referring to the drawings, a multifunctional cross vehicular assembly made in accordance with a preferred form of the present invention basically comprises a knee bolster assembly 90, an instrument panel 150, a reinforcement assembly 170, a duct assembly 230, and a fastening assembly 320.

Figure 1:
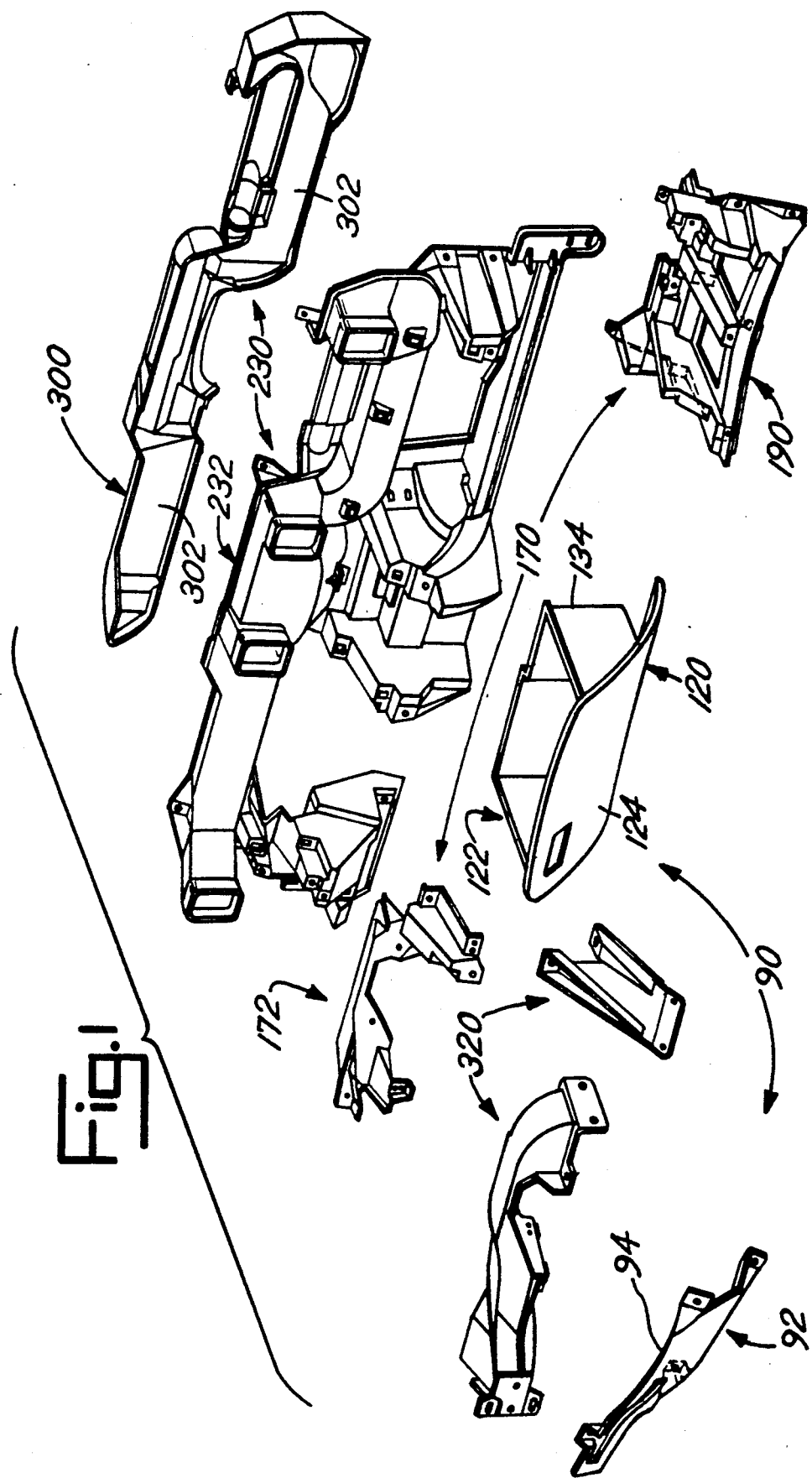
FIG. 1 is an exploded, perspective view of a multifunctional cross vehicular assembly made in accordance with a preferred embodiment of the invention.
Figure 2:
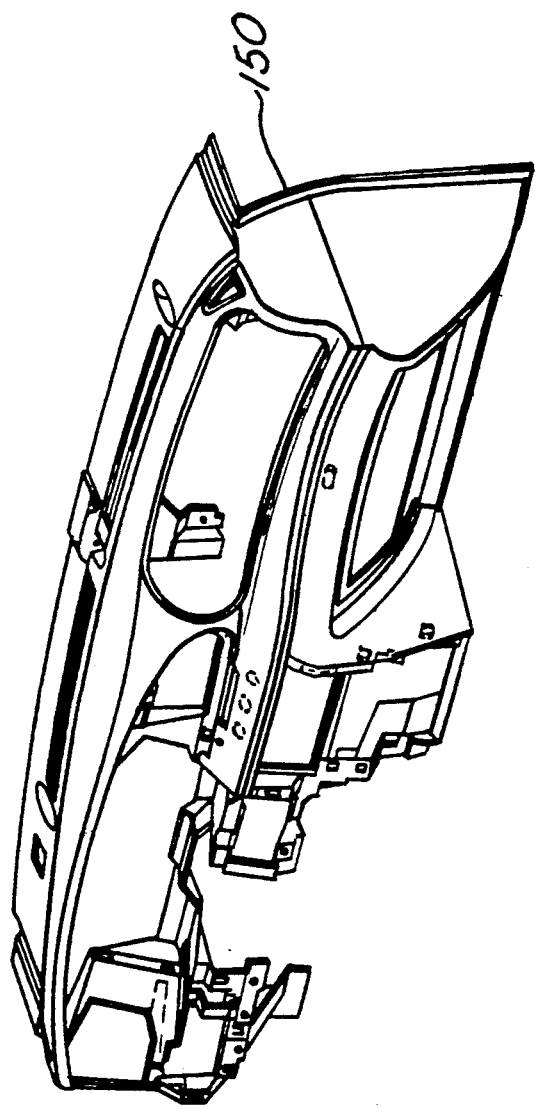
FIG. 2 is a perspective view of a preferred form of instrument panel that is supported by a portion of the assembly shown in FIG. 1.

Referring to FIGS. 1 and 4, knee bolster assembly 90 comprises a driver bolster 92, including a 1.5-2.0 millimeter thick steel plate 94 fabricated with fastening holes 98-101. As shown in FIG. 4, a driver bolster cover 110 including a 2.5 millimeter thick hard plastic shell 112 is placed over driver bolster plate 94 so as to leave an air space 114 (FIGS. 6, 6A, 7, 7A and 8).

Referring to FIGS. 1, 9, 9A, 10 and 10A, knee bolster assembly 90 also includes a passenger bolster 120 that is incorporated into a glove compartment 122 having a cover 124. The cover supports a 1.5-2.0 millimeter thick steel plate 126 that is covered with a vinyl skin 128 and foam padding 129. Glove compartment 122 is rotatably supported on a piano hinge 132 in order to give a passenger of the vehicle access to a glove compartment liner 134 that forms a drawer-like compartment.

Referring to FIGS. 2, 9, 9A, 10 and 10A, instrument panel 150 includes foam padding 154 that is fitted between a vinyl cover 152 and a hard plastic 2.5 millimeter thick shell 156.

Referring to FIGS. 1 and 4, reinforcement assembly 170 includes a driver reinforcement member 172 that defines an arch 174 and fastening holes 178-184. Member 172 is integrally compression molded from 40% random glass polypropylene and has a nominal thickness of 4 millimeters. This is an important feature that reduces weight and increases reliability and quietness. Alternatively, member 172 could be injection molded.

Referring to FIGS. 1 and 5, reinforcement assembly 170 includes a passenger reinforcement member 190 defining a rear retaining edge 192 adapted to comate with passenger bolster plate 126 (FIGS. 9A and 10A) in the event of a collision. As shown in FIGS. 5, 9A and 10A, member 190 also includes a depending lip 193, a track for an airbag mechanism 194, and attachment holes 200-210. Member 190 is integrally injection molded from polycarbonate and has a nominal thickness of 2.5 millimeters. This is an important feature that reduces weight and increases reliability and quietness.

Referring to FIGS. 1, 3, 9 and 10, duct assembly 230 includes a rear duct member 232 that defines air distribution inlets 234-237. Assembly 230 also includes a rear channel member 239 that defines a portion of a duct 240 for the air distribution system of the vehicle. Member 232 defines a glove compartment opening 242 and a shelf edge 243 (FIG. 3) to which piano hinge 132 (FIGS. 9 and 10) is fastened Member 232 also defines a steering column opening 244 (FIG. 3) that is positioned around a steering column of a vehicle (not shown). A cowl attachment tab 246 provides a means of attaching the passenger side portion of the duct assembly to cowl 50. Member 232 also includes solid frame sections 248-253 and fastening holes 260-280 arranged as shown. Member 232 is integrally injection molded from acrylonitrile-butadiene styrene ("ABS") plastic having a nominal thickness of 2.5 millimeters in the portions that form duct 240 and a nominal thickness of 2.5 millimeters in the portions that form frame sections 248-253. This is an important feature that reduces weight and increases reliability and quietness.

Referring to FIGS. 1, 3, 9 and 10, duct assembly 230 also includes a front duct member 300 that incorporates a front channel member 302. Front duct member 300 is integrally injection molded from ABS plastic having a nominal thickness of 2.5 millimeters. This is an important feature that reduces weight and increases reliability and quietness.

Rear channel member 239 and front channel member 302 are adapted to comate in order to form the ducts of the air distribution system of the vehicle. As shown in FIGS. 10A and 11, members 239 and 302 are bonded together by tongue and groove construction utilizing a plastic adhesive. The tongue and groove construction is formed by tongues 304 and 305 and groove members 306-309 arranged as shown (FIG. 11). An adhesive bonds together rear and front channel members 239 and 302 to form a light, rigid, rattle-free assembly that provides sufficient support for bolster assembly 90. The preferred adhesive is a polyamide hot-melt although other adhesives, such as 2 part epoxy-urethane sealer, are acceptable.

Referring to FIGS. 1 and 4, fastening assembly 320 comprises a steel beam 322 defining an arch 324, as well as fastening holes 330-334. Assembly 320 also includes a steel brace 340 defining fastening holes 342-345.

Figure 3:
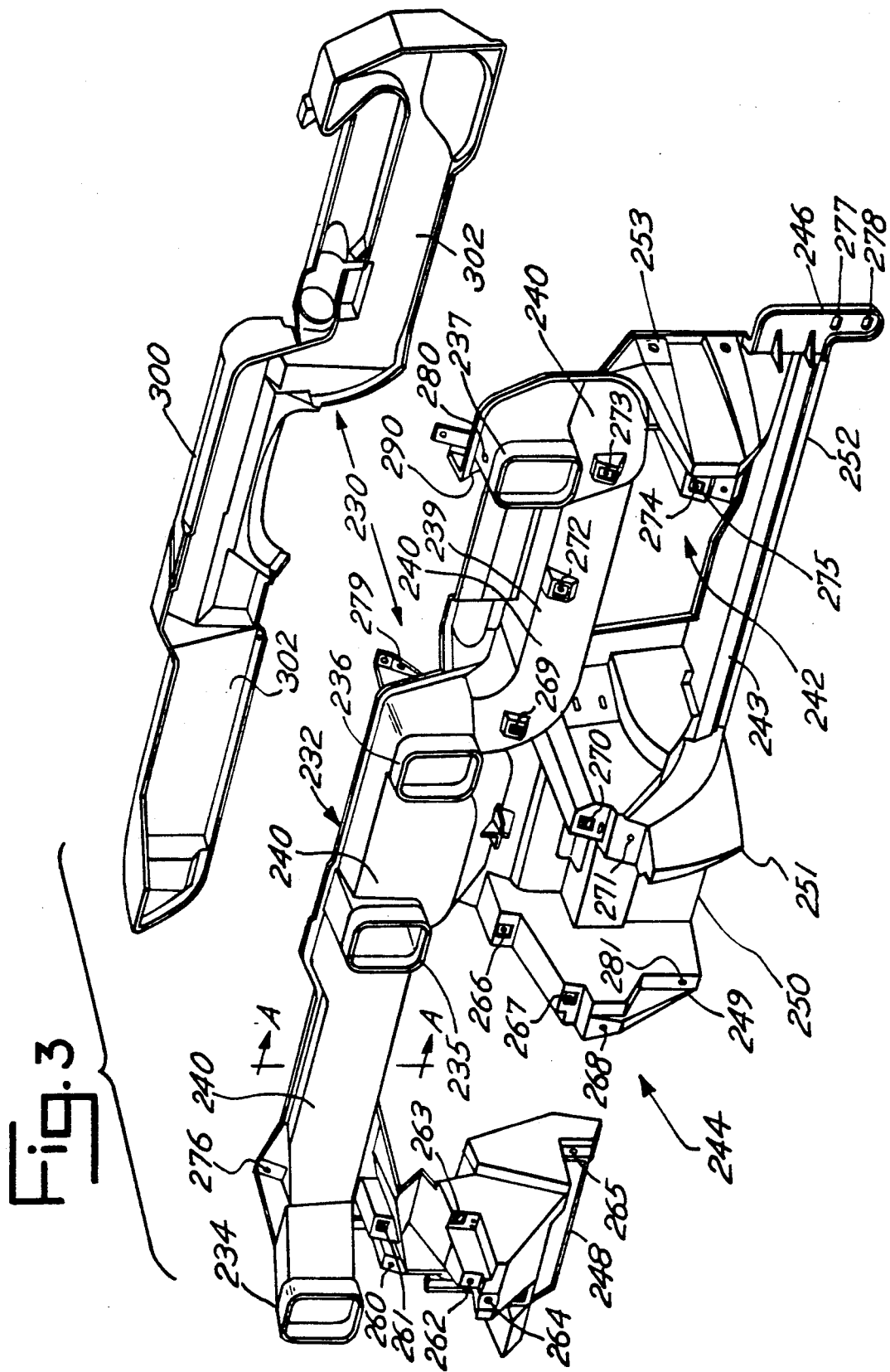
FIG. 3 is an enlarged, exploded, perspective view of another portion of the assembly shown in FIG. 1.

The various components as shown in the figures are assembled in the following manner. Referring to FIGS. 3 and 11, rear duct member 232 is bonded to front duct member 300 using tongue and groove construction and adhesive in the manner previously described. Referring to FIGS. 3 and 4, driver reinforcement member 172 is attached to rear duct member 232 by aligning holes 184 and 183 with holes 266 and 267, respectively, and fastening with suitable screws. Likewise, holes 178 and 179 are aligned with holes 261 and 263, respectively, and fastened with suitable screws.

Fastening assembly 320 is interconnected by attaching one bolt through mating holes 334 and 345 and another bolt through mating holes 333 and 344. Holes 181 and 180 of reinforcement member 172 are aligned with corresponding holes (not shown) in steel beam 322 and are fastened with screws so that arches 174 and 324 are in alignment. Holes 342 and 343 are used to fasten brace 342 to the top of the cowl and holes 330 and 331 are used to connect beam 322 to the driver side portion of the cowl of the vehicle. Driver bolster 92 is connected to reinforcement member 172 and rear duct member 232 by aligning holes 98 and 99 with holes 264 and 265, respectively, and by fastening with suitable screws. Likewise, holes 100 and 101 are aligned with holes 182 and 281, respectively, and are fastened with suitable screws.

Referring to FIGS. 3 and 5, passenger reinforcement member 190 is connected to rear duct member 232 by aligning holes 208 and 209 with holes 273 and 275, respectively, and by fastening with screws. Likewise, holes 201 and 202 are aligned with holes 269 and 270 and are fastened with screws. Holes 200 and 207 on member 190 are aligned with holes 279 and 280 on member 232, and are fastened with screws. Instrument panel 150 is fastened to the following holes of rear duct member 232: 260, 262, 276, 279, 280, 274, 271 and 268.

In the event of a collision, if the driver or passenger are not wearing lap seat belts, the forward motions of their upper bodies are intended to be restrained by an airbag or upper torso belt. The forward motion of their legs are intended to be restrained by driver bolster 92 and passenger bolster 120 which absorb kinetic energy from the knees of the driver and passenger, respectively. The amount of kinetic energy absorbed can be carefully controlled because the bolsters are fabricated from uniform steel plates 94 and 126 that can be calibrated with relative ease. According to an important feature, reinforcement members 172 and 190, as well as duct assembly 230, transfer force from the knee bolsters without absorbing substantial kinetic energy from the knees of the driver or passenger in the event of a collision. The applicants have surprisingly discovered that this result can be accomplished even though the reinforcement members and duct assembly are fabricated from injection molded plastic. This feature eliminates the need for steel reinforcement or frame members typically required by the prior art in order to provide sufficient reinforcement for knee bolsters.

According to another important feature, duct assembly 230, reinforcement assembly 170 and the body of the vehicle, including the cowl, are rigidly interconnected, and transfer force from the body of the vehicle through the duct assembly and reinforcement assembly to the knee bolster plates 94 and 126 during a collision. Such transfer of force stabilizes the position of the knee bolster plates relative to the body of the vehicle during a collision. Kinetic energy from the knees of the driver and/or passenger is absorbed by the knee bolster plates. By fabricating and fastening the components in the manner described, the knee bolster plates are enabled to cushion and limit the movement of the knees of the driver and passenger in the event of a collision, as shown in FIGS. 6, 6A, 7, 7A, 9, 9A, 10 and 10A.

Figure 13:
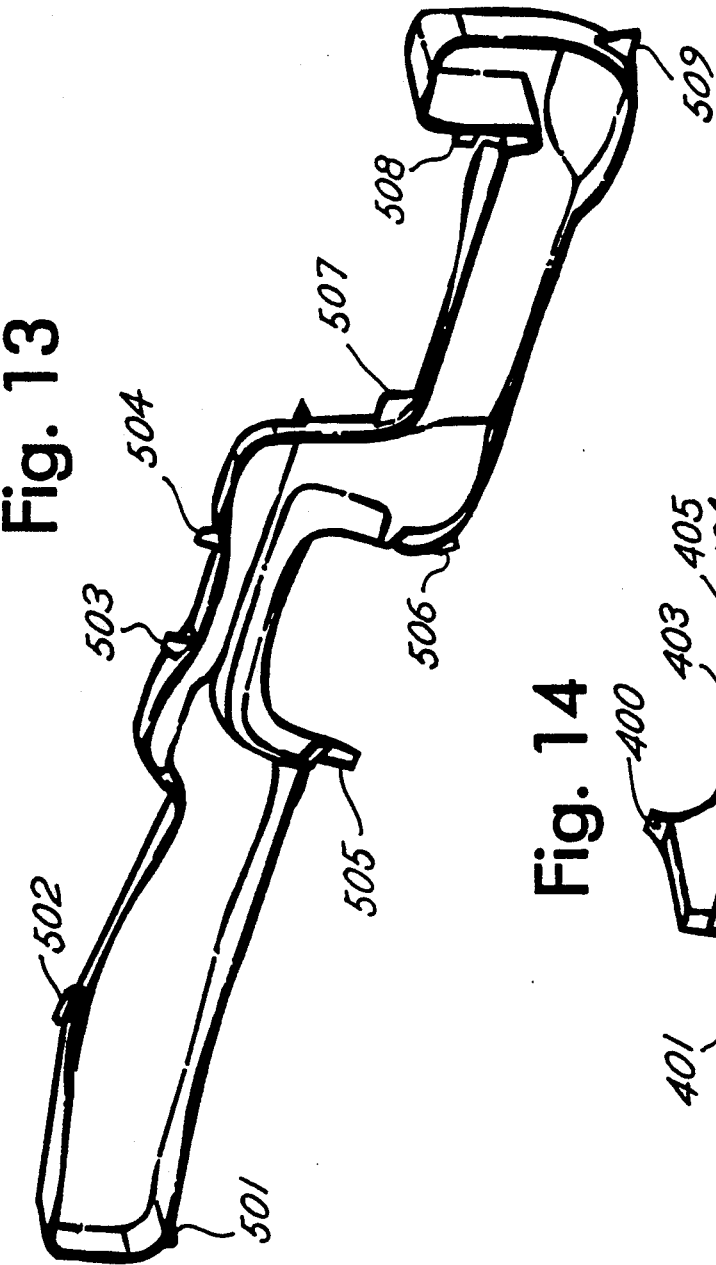
FIG. 13 is an alternative embodiment of the front duct member shown in FIG. 3.
Figure 14:
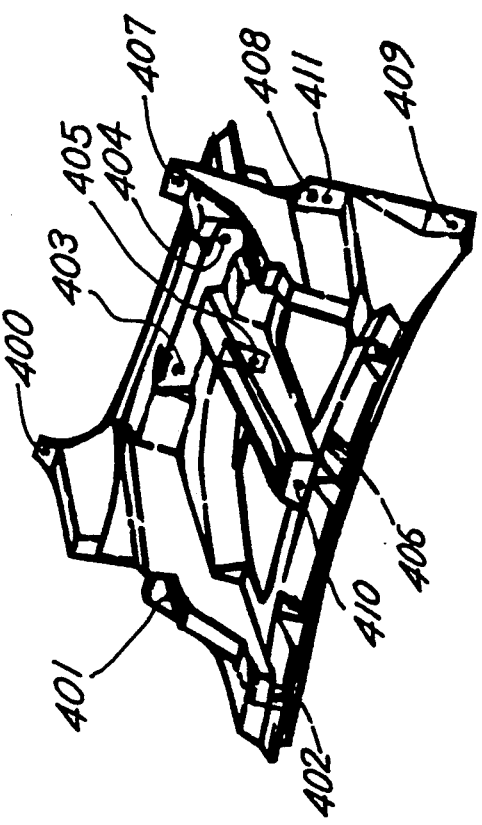
FIG. 14 is an alternative embodiment of the passenger reinforcement member shown in FIG. 5.

FIGS. 12-14 show alternative embodiments of the rear duct member, front duct member and passenger reinforcement member. In FIGS. 12-14, alternative duct to substrate attachment holes 400-411 (FIG. 14) and 460-489 (FIG. 12) are illustrated. In FIG. 13, alternative sonic weld tabs 501-509 are illustrated.

The various preferred versions or embodiments of the invention described in detail above are intended only to be illustrative of the invention. Those skilled in the art will recognize that modifications, additions and substitutions can be made in the various features and elements of the invention without departing from the true scope and spirit of the invention. The following claims are intended to cover the true scope and spirit of the invention.

What we claim is:

1. A multifunctional cross vehicular assembly for bolstering one or more knees of one or more occupants in the event of a collision, said assembly being adapted for use in a motorized vehicle having a body including a cowl adjacent a windshield and having a compartment for said occupants, said assembly comprising:

knee bolster means for absorbing kinetic energy from said one or more knees in the event said one or more knees impact said knee bolster means;

instrument panel means for carrying said knee bolster means;

reinforcement means fabricated from plastic for transferring force from said knee bolster means without absorbing substantial kinetic energy from said one or more knees;

duct means fabricated from plastic extending across more than half the entire width of said compartment of said vehicle between said cowl and said instrument panel for defining ducts of an air distribution system and for transferring force from said reinforcement means without absorbing substantial kinetic energy from said one or more knees;

first fastening means for fastening said instrument panel to said duct means;

second fastening means for fastening said reinforcement means to said duct means; and third fastening means for fastening said duct means to said body, whereby the position of the knee bolster means relative to said body is stabilized by the transfer of force through the reinforcement means and the duct means to said body while kinetic energy from said one or more knees is absorbed by said knee bolster means to cushion and limit movement of said one or more knees in the event of a collision.

2. An assembly, as claimed in claim 1, wherein said knee bolster means comprises a steel plate having a thickness of about 1.5 to 2.0 millimeters.

3. An assembly, as claimed in claim 1, wherein said reinforcement means is solid plastic formed by injection molding.

4. An assembly, as claimed in claim 3, wherein one of said occupants is a driver, wherein said knee bolster means comprises a left knee bolster means for bolstering one or more knees of said driver and a right knee bolster means for bolstering one or more knees of a second of said occupants other than said driver, and wherein said reinforcement means comprises a left reinforcement means for transferring force from said left knee bolster means without absorbing substantial kinetic energy from said one or more knees of said driver and right reinforcement means for transferring force from said right knee bolster means without absorbing substantial kinetic energy from said one or more knees of said second occupant.

5. An assembly, as claimed in claim 4, wherein said left reinforcement means comprises 40% random glass polypropylene.

6. An assembly, as claimed in claim 4, wherein said right reinforcement means comprises polycarbonate.

7. An assembly, as claimed in claim 1, wherein said duct means comprises:

integral rear duct means for defining air distribution inlets for said instrument panel;

integral front duct means adapted to comate with said rear duct means for producing one or more cavities for defining said ducts of said air distribution system; and third fastening means for fastening said rear duct to said front duct.

8. An assembly, as claimed in claim 7, wherein said third fastening means comprises a tongue and groove assembly secured by adhesive.

9. An assembly, as claimed in claim 7, wherein said reinforcement means is at least partially attached to the portion of said integral rear duct means for defining said ducts.

10. An assembly, as claimed in claim 1, wherein said third fastening means comprises:
   first means for fastening said duct means to the right side of said cowl;
   second means for fastening said duct means to the left side of said cowl; and
   third means for fastening said duct means to the top of said cowl.

11. A multifunctional cross vehicular assembly for bolstering one or more knees of one or more occupants in the event of a collision, said assembly being adapted for use in a motorized vehicle having a body including a cowl adjacent a windshield and having a compartment for said occupants, said assembly comprising:
   knee bolster means for cushioning said one or more knees in the event of a collision;
   duct means fabricated from injection molded plastic and extending across more than half the entire width of said compartment of said vehicle between said cowl and said knee bolster means for defining ducts of an air distribution system for said compartment;
   reinforcement means fabricated from injection molded plastic and located between said knee bolster means and said duct means for stabilizing the position of said knee bolster means during said collision; and
   fastening means for rigidly interconnecting said duct means, said reinforcement means and said body and for transferring force from said body through said duct means and said reinforcement means to said knee bolster means during said collision, whereby the position of said knee bolster means relative to said body is stabilized while kinetic energy from said one or more knees is absorbed by said knee bolster means.

12. An assembly, as claimed in claim 11, wherein said knee bolster means comprises a steel plate having a thickness of about 1.5 to 2.0 millimeters.

13. An assembly, as claimed in claim 11, wherein one of said occupants is a driver, wherein said knee bolster means comprises a left knee bolster means for bolstering one or more knees of said driver and a right knee bolster means for bolstering one or more knees of a second of said occupants other than said driver, and wherein said reinforcement means comprises a left reinforcement means for transferring force to said left knee bolster means and right reinforcement means for transferring force to said right knee bolster means.

14. An assembly, as claimed in claim 13, wherein said left reinforcement means comprises 40% random glass polypropylene.

15. An assembly, as claimed in claim 14, wherein said left reinforcement means comprises structural members having a mean thickness of about 2.5 millimeters.

16. An assembly, as claimed in claim 13, wherein said right reinforcement means comprises polycarbonate.

17. An assembly, as claimed in claim 16, wherein said right reinforcement means comprises structural members having a mean thickness of about 2.5 millimeters.

18. An assembly, as claimed in claim 11, wherein said duct means comprises:
   integral rear duct means for defining air distribution inlets;
   integral front duct means adapted to comate with said rear duct means for producing one or more cavities for defining said ducts of said air distribution system; and
   second fastening means for fastening said rear duct to said front duct.

19. An assembly, as claimed in claim 18, wherein said second fastening means comprises a tongue and groove assembly secured by adhesive.

20. An assembly, as claimed in claim 18, wherein said reinforcement means is at least partially attached to the portion of said integral rear duct means for defining said ducts.

* * * * *